US011596117B2

(12) United States Patent
Koehler et al.

(10) Patent No.: US 11,596,117 B2
(45) Date of Patent: Mar. 7, 2023

(54) SYSTEM FOR OPERATING A GARDEN EQUIPMENT CONTROL DEVICE

(71) Applicant: HUSQVARNA AB, Huskvarna (SE)

(72) Inventors: Dennis Koehler, Ulm (DE); Martin Lienhard, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/783,867

(22) PCT Filed: Nov. 19, 2020

(86) PCT No.: PCT/EP2020/082668
§ 371 (c)(1),
(2) Date: Jun. 9, 2022

(87) PCT Pub. No.: WO2021/115754
PCT Pub. Date: Jun. 17, 2021

(65) Prior Publication Data
US 2023/0027397 A1 Jan. 26, 2023

(30) Foreign Application Priority Data
Dec. 11, 2019 (SE) .................................... 1951433-0

(51) Int. Cl.
*A01G 25/16* (2006.01)
*H04W 4/00* (2018.01)
(Continued)

(52) U.S. Cl.
CPC .............. *A01G 25/16* (2013.01); *H04W 4/80* (2018.02); *H04W 12/50* (2021.01)

(58) Field of Classification Search
CPC ......... A01G 25/16; H04W 4/80; H04W 12/50
See application file for complete search history.

(56) References Cited

U.S. PATENT DOCUMENTS 6,480,953 B1 * 11/2002 Hughes ............... G06F 11/2089
714/6.32
2007/0234032 A1 * 10/2007 Chen ..................... G06F 13/385
713/100
(Continued)

FOREIGN PATENT DOCUMENTS

CN    201491576 U    6/2010
CN    201821720 U    5/2011
(Continued)

OTHER PUBLICATIONS

International Search Report and Written Opinion from International Application No. PCT/EP2020/082668 dated Feb. 19, 2021, all pages cited in its entirety.
(Continued)

*Primary Examiner* — Mark A Connolly
(74) *Attorney, Agent, or Firm* — Burr & Forman, LLP

(57) ABSTRACT

A system (100) for controlling garden equipment by operating a garden equipment control device (110), the system (100) comprising: a first module (120) configured to pair with the garden equipment control device (110) over a first network (N1), where the first module (120) is configured to control the garden equipment control device (110) when paired therewith; a second module (200) configured to wirelessly communicate with the garden equipment control device (110) over a second network (N2), wherein the second module (200) is connected to the garden equipment control device (110) through a gateway (210); and a controller associated with the garden equipment control device (110), wherein the controller is configured to check whether the garden equipment control device (110) is paired with the gateway (210); characterized in that: wherein when the controller determines that the garden equipment control device (110) is paired with the gateway (210): the second module (200) is enabled to control the garden equipment (Continued)

control device (110), and the first module (120) is disabled to control the garden equipment control device (110).

14 Claims, 3 Drawing Sheets

(51) Int. Cl.
    *H04W 12/00*     (2021.01)
    *H04W 4/80*     (2018.01)
    *H04W 12/50*     (2021.01)

(56) References Cited

U.S. PATENT DOCUMENTS

| | | |
|---|---|---|
| 2013/0131874 A1 | 5/2013 | Shupe et al. |
| 2014/0039697 A1 | 2/2014 | Weiler et al. |
| 2015/0223415 A1 | 8/2015 | Abhyanker |
| 2017/0147011 A1 | 5/2017 | Klein et al. |
| 2018/0014480 A1 | 1/2018 | Montgomery et al. |
| 2018/0077882 A1 | 3/2018 | Gilliam et al. |

FOREIGN PATENT DOCUMENTS

| | | | |
|---|---|---|---|
| CN | 202435912 U | 9/2012 | |
| CN | 203340718 U | 12/2013 | |
| CN | 203860171 U | 10/2014 | |
| CN | 105432438 A | 3/2016 | |
| CN | 105830870 A | 8/2016 | |
| CN | 105900800 A | 8/2016 | |
| CN | 205563199 U | 9/2016 | |
| CN | 106171865 A | 12/2016 | |
| CN | 106258858 A | 1/2017 | |
| CN | 104904570 B | 1/2018 | |
| CN | 107711452 A | 2/2018 | |
| CN | 110178706 A | 8/2019 | |
| WO | WO-2017174148 A1 * | 10/2017 | ............ A01G 25/02 |
| WO | 2018171965 A1 | 9/2018 | |

OTHER PUBLICATIONS

Search Report and Office Action for Swedish Application No. 1951433-0 dated Sep. 15, 2020.
International Search Report and Written Opinion for International Application No. PCT/EP2020/082668 dated Feb. 19, 2021.

* cited by examiner

SYSTEM FOR OPERATING A GARDEN EQUIPMENT CONTROL DEVICE

TECHNICAL FIELD

The present disclosure relates to a garden equipment control device. More specifically, the present disclosure relates to a system with portable devices for operating the garden equipment control device.

BACKGROUND

Control devices may find applications where one or more parameters need to be controlled on conditional basis such as for applications involving irrigation systems. The irrigation systems are generally used for supplying water to plants, trees, grass etc. in application areas such as lawns, gardens or a balcony of a household. Generally, the irrigation systems utilize a control device (or controller) for ease of operation by a user with access to different devices. The different devices allow options such as for registering a command from the user for activation or deactivation of various functionalities and options of the irrigation systems.

However, there may be instances where the control device may not be readily accessible to the user say when some of the different devices are not enabled or are blocked to interact with the control device. This could lead to hardships in use of the irrigation systems. So, there have been efforts to enhance operation of the control device based on preferential control by the different devices. However, there remain constrains such as intrusion or competition among the different devices to operate the user interface among other shortcomings.

An example of a wireless terminal equipment associated with an agricultural irrigation water saving system is provided in Chinese patent application 106,258,858 (hereinafter referred to as '858 reference). The '858 reference provides the agricultural irrigation water saving system. The system comprises a web platform, a wireless gateway and wireless terminal equipment. Further, a mobile communication network is adopted for communication between the web platform and the wireless gateway, and a short-range wireless communication network is adopted for communication between the wireless gateway and the wireless terminal equipment. The web platform issues a control instruction to the wireless gateway, the wireless gateway forwards the instruction to the wireless terminal equipment, and then the wireless terminal equipment carries out corresponding operation and returns a result.

There is a need for an improved system for operating a control device by different devices, where some of the different devices can preferentially enabled to pair with the control device.

SUMMARY

In view of the above, it is an objective of the present invention to solve or at least reduce the drawbacks discussed above. The objective is at least partially achieved by a system for controlling garden equipment by operating a garden equipment control device. The system includes a first module configured to pair with the control device over a first network. The first module is configured to control the garden equipment control device when paired therewith. The system includes a second module configured to wirelessly communicate with the garden equipment control device over a second network. The second module is connected to the garden equipment control device through a gateway. The system includes a controller associated with the garden equipment control device. The controller is configured to check whether the garden equipment control device is paired with the gateway. The system is characterized in that when the controller determines that the garden equipment control device is paired with the gateway, the second module is enabled to control the garden equipment control device, and the first module is disabled to control the garden equipment control device. Thus, the present disclosure provides a simple, user-friendly and convenient operation of the garden equipment control device by preferential control and enablement of some devices. This allows to avoid or take care of situations where the first and the second module may send differing instructions (say different watering schedules). Garden equipment to be controlled by the garden equipment control device may include components of an irrigation system, such as valves, nozzles or pumps or water control computers. It shall be appreciated that the garden equipment control device may be an irrigation control device or a water computer. Alternatively or additionally, garden equipment may include components of lawn care devices, such as robotic lawn care devices or operator driven lawn care devices, e.g. a robotic lawn mower or a charging station for such a lawn mower, components of a garden illumination system or garden tools such as rechargeable battery operated garden tools or a charging station for such garden tools. Further, alternatively or additionally, garden equipment may include sensors or a sensor system or a camera such as an outdoor camera, e.g. irrigation control sensors or motion sensors configured to detect information usable for control of any other garden equipment. Moreover, garden equipment may include controllable electrical adapter plugs, e.g. electrical adapter plugs which can be switched on and off via the garden equipment control device, configured for use with other garden equipment. Furthermore, garden equipment shall be understood as including outdoor and indoor garden equipment. In addition, garden equipment to be controlled by the garden equipment control device is enabled to be remotely controlled.

According to an embodiment of the present invention, when the controller determines that the garden equipment control device is not paired with the gateway, the first module is enabled to control the garden equipment control device. This allows to inhibit the garden equipment control device to be removed from the system which includes the gateway. In this case, the garden equipment control device may continuously and/or repetitively accept commands from the first module.

According to an embodiment of the present invention, any of the first module and the second module is incorporated in a portable user device. The portable user device can be a smartphone, PDA and the like.

According to an embodiment of the present invention wherein both the first module and the second module are incorporated in a single portable user device. Thus in case the first module and the second module are realized as programming code or application, for example being a so called App, accessible via an icon on the screen of the portable device both the modules could be incorporated in a single portable device. Thus the user does not need to use different portable devices to control the garden equipment control device within different setups.

According to an embodiment of the present invention, the first network and the second network are based on same radio transmission. According to another embodiment of the present invention, the radio transmission is based on any one of a Bluetooth communication, and WiFi, or any other technology.

According to an embodiment of the present invention, both the first network and the second network are configured with any one of the first module or the second module. This makes the application of the system of the present disclosure more user-friendly and customizable.

According to an embodiment of the present invention, the portable user device is a smartphone configured with any of the any of the first module and the second module being an application to control the garden equipment control device.

According to an embodiment of the present invention, the first module and the second module are configured on a portable user device. This allows ease of control of the garden equipment control device by use of a single smart phone (i.e. the portable user device) having the first module and the second module.

According to an embodiment of the present invention, the system comprises at least two, in particular multiple second modules, wherein when the at least two, in particular multiple second modules are available for pairing with the gateway, any of the at least two, in particular multiple second modules, can be given preference to pair with the garden equipment control device through the gateway based on one or more conditions related to the at least two, in particular multiple, second modules. Thus, a hierarchy can be established to avoid conflicts related to possibly interfering second modules.

According to an embodiment of the present invention, the last saved or connected or paired second module with the garden equipment control device and/or the gateway is given preference over the rest of the multiple second modules to pair with the garden equipment control device through the gateway. Thus, access to the gateway is clearly regulated according to a predefinition with respect to the multiple second modules.

According to an alternative embodiment, the system enables a user to set pre-stored preference orders, settings, timelines, or any other criteria for the multiple second modules to pair with the garden equipment control device through the gateway. Thus, access to the gateway can be regulated by a user according to user defined desires.

According to an embodiment of the invention, the garden equipment control device can be removed from the gateway or unpaired with the gateway and is configured to be controlled via the first module independent from the gateway. This embodiment enables to separate the garden equipment control device from the gateway and to use it independent therefrom.

According to an embodiment of the invention, the system is configured, if the controller determines that the garden equipment control device is not paired with the gateway, then to enable the first module to control the garden equipment control device. Thus, a default possibility to control the garden equipment control device is given automatically upon determination of the status of the garden equipment control device.

According to an embodiment of the invention, pairing of the at least two, in particular multiple, second modules with the garden equipment control device through the gateway can be enabled only after authentication based on one or more of a passkey, a biometric ID, a questionnaire and the like, in particular, this authentication can be performed by one of the at least two, in particular multiple, second modules, preferably as prespecified by the user. Thus, unauthorized access to the irrigation control is prevented. In the case that multiple second modules are provided, it is particularly advantageous if authentification can be performed by exactly one of the second modules, wherein authentification is not enabled by the rest of the second modules. More precisely, this says that one module enables the authentification and, thus, is configured to enable pairing of all remaining second modules. In other words, the remaining modules cannot be paired, if authentification is not positively confirmed via the second module on which the authentification is performed.

According to an embodiment the garden equipment control device is operably coupled, in particular operates or controls, at least one or two or a plurality of garden equipment components, in particular one or two or more irrigation components, preferably valves and/or valve units and/or nozzles and/or pumps and/or water control computers, and/or in particular one or two or more lawn care devices, preferably robotic lawn care devices or operator driven lawn care devices, e.g. robotic lawn mowers or charging stations for robotic lawn mowers, and/or in particular components of a garden illumination system, preferably lamps or light emitting elements or LEDs or LED-units or control elements for controlling lamps or light emitting elements or LEDs or LED-units, and/or in particular garden tools, preferably rechargeably battery operated garden tools or charging stations for rechargeably battery operated garden tools, and/in particular sensors or sensor units or sensor systems or cameras, preferably irrigation control sensors or motion sensors or outdoor surveillance cameras, and/or in particular electrical adapter plugs, preferably switchable electrical adapter plugs or adjustable electrical adapter plugs. The system according to the invention, thus, enables to embed a large variety of garden equipment components or a variable system of garden equipment components to be commonly controlled via the garden equipment controller. It is possible to add to or to remove garden equipment components from the resulting system and to reuse these components in another system. The garden equipment components present in the created garden equipment system can be controlled in dependence on each other, e.g. sensors may be associated to certain components such that operation of an irrigation system and a lawn care device can be adapted on the output of one or more sensors.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
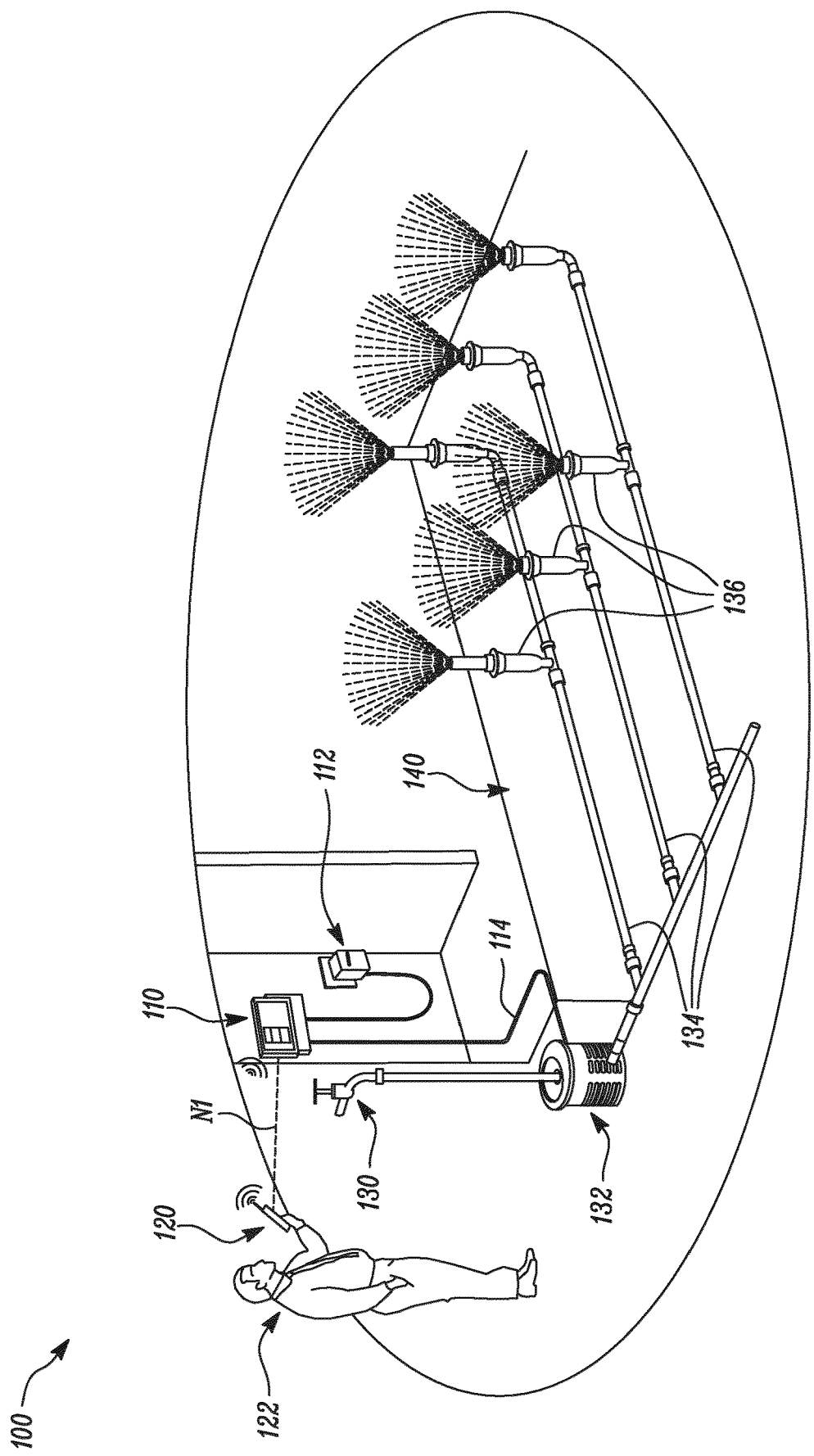
FIG. 1 shows a system with a first module for operating a control device, in accordance with an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates a system 100 for operating a control device 110. The system 100 can find application to control any parameter, say for controlling irrigation of an irrigation zone 140 such as a garden, lawn, field and the like. The system 100 can find application for outdoor as well as indoor installations. The system 100 has the control device 110 to control one or more components, devices, ports associated with the system 100. This allows the desired operation of the system 100 to irrigate the irrigation zone 140 by a user controlling the control device 110. The control device 110 can be controlled either manually or wirelessly by any means of radio transmission.

The control device 110 can be an irrigation controller or a water computer in a preferred embodiment, although other applications of the control device 110 are well within the scope. The control device 110 is powered by a power supply 112 to allow the control device 110 to operate or control a valve unit 132 by means of control wires 114. The valve unit 132 is connected to a fluid supply 130 to control the fluid supplied to the irrigation zone 140 by operation of the control device 110. On proper setup of the control device 110, the valve unit 132 can control the flow of the fluid from the fluid supply 130 to multiple pipes 134 connected to the valve unit 132. The pipes 134 are generally provided with one or more irrigation devices 136 to irrigate the desired area of the irrigation zone 140. The present disclosure illustrates three rows of the pipes 134 having two sets of the irrigation devices 136 each, however, the system 100 of the present disclosure can be implemented with different arrangements of the pipes 134 and the irrigation devices 136 as per the need.

As illustrated, the system 100 includes a first module 120 operated by a first user 122. In the exemplary embodiment the first module 120 is incorporated on the first user's 120 mobile device. The first module 120 is configured to pair with the control device 110 over a first network N1. The first module 120 can be incorporated in a short-range device to allow direct control of the control device 110, generally up to an operating distance in some embodiments. In an embodiment, the first module 120 is a portable user device. The portable user device can be a smartphone, Personal Digital Assistant (PDA), laptop or any other device as used or known in the art. The first module 120 is configured to control the control device 110 when paired with the control device 110 to irrigate the irrigation zone 140 as per the need. The control device 110 may also have an internal memory to store instructions for handling the control device 110 as communicated by the first module 120, and a controller (not shown) to execute the instruction as per the implementation requirement.

In some embodiments, the portable user device is a smartphone configured with an application (i.e. a mobile app) to control the control device 110. The application can have multiple options, interfaces and features to control different irrigation settings, fluid volume, and irrigation timing, among other working parameters of the control device 110.

Figure 2:
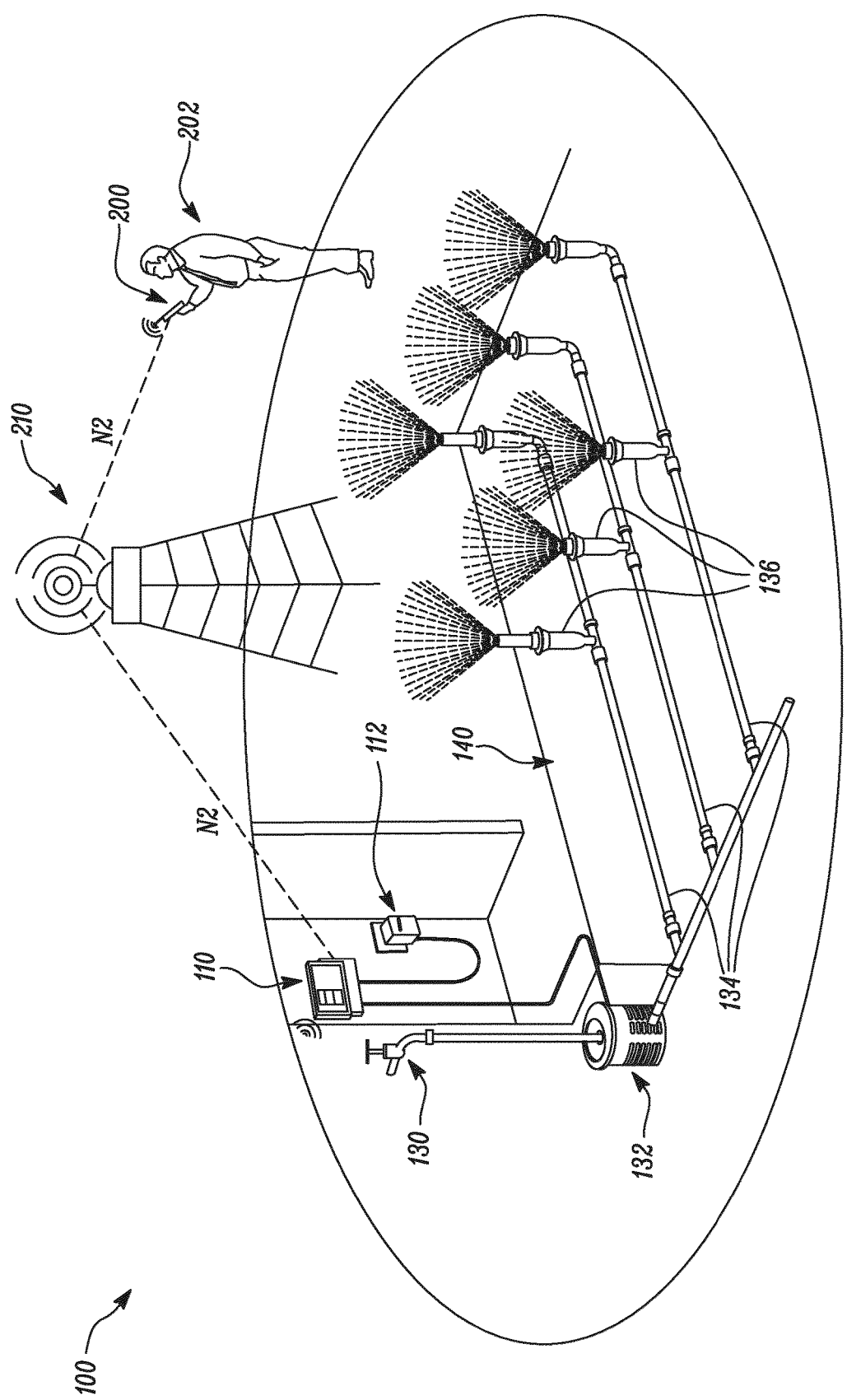
FIG. 2 shows the system with a second module for operating the control device, in accordance with another embodiment of the present invention.

FIG. 2 illustrates the system 100 with a second module 200 for operating the control device 110, in accordance with another embodiment of the present invention. The second module 200 is operated by a second user 202, who may be at a substantial distance (say compared to the operating distance for the first module 120) from the control device 110 as illustrated in the present figure. The system 100 includes the second module 200 configured to wirelessly communicate with the control device 110 over a second network N2. The second module 200 is connected to the control device 110 through a gateway 210. The gateway 210 may be any telecommunication device such as a router as will be evident to a person having knowledge in the art. The gateway 210 can serve to allow a secure connection and communication between the second module 200 and the control device 110 while not allowing any other device to communicate with the control device 110 through the gateway 210. The second module 200 can have an extended range of working due to role of the gateway 210.

In an embodiment, both the first module 120 and the second module 200 may be configured with/on a single device (i.e. smart phone, PDA, and the like such as to make use of both the first network N1 and the second network N2. As will be evident to a person having knowledge in the art, any or both the first module 120 and the second module 200 may be computer program, applications ("apps") or any other software-based technology configurable with any of the single device. This makes the application of the system 100 of the present disclosure more user-friendly and customizable. In an embodiment, the first module 120 and the second module 200 may be mobile applications configured on a single device. A single user may use the device to control irrigation through either one of the first module 120 and the second module 200 based on implementation requirement.

The control device 110 includes the controller associated with the control device 110. The controller is configured to check whether the control device 110 is paired with the gateway 210. The system 100 is operated by the second module 200 when the controller determines that the control device 110 is paired with the gateway 210. While the control device 110 is paired with the gateway 210, the second module 200 is enabled to control the control device 110 (as shown in FIGS. 2, 3), and the first module 120 is disabled (as shown in FIG. 3) to control the control device 110.

Figure 3:
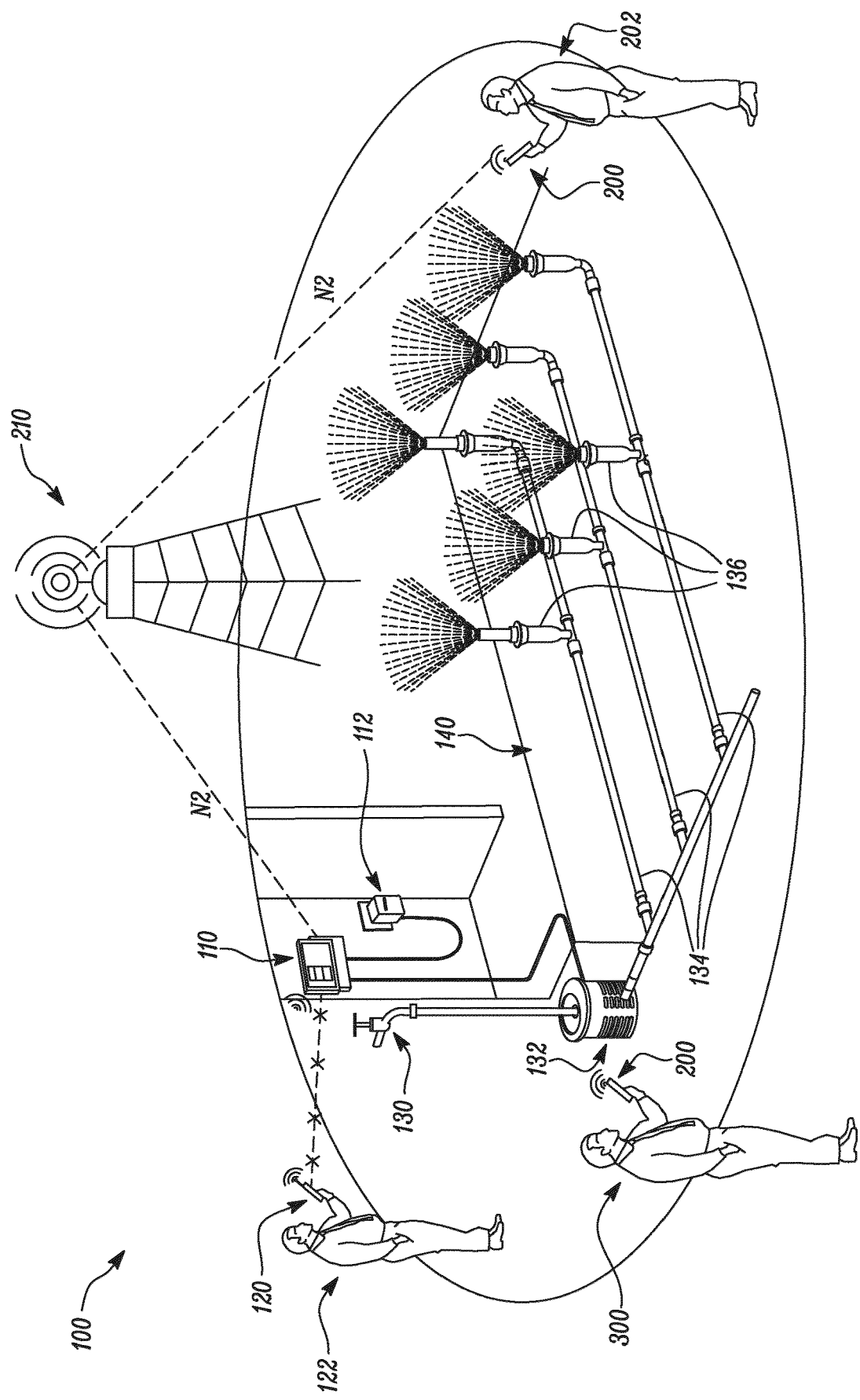
FIG. 3 shows the system with the first module and multiple second modules, in accordance with another embodiment of the present invention.

FIG. 3 illustrates the system 100 with the first module 120 and multiple second modules 200, in accordance with another embodiment of the present invention. The second module 200 which is operated by the second user 202 is paired with the control device 110 through the gateway 210. While the second module 200 operated by the second user 202 is paired, the first module 120 operated by the first user 122 and the second module 200 operated by a third user 300 are disabled to pair with the control device 110. The present disclosure illustrates a single first module 120 and two second modules 200 operated by different users, however actual implementation of the system 100 may have different numbers and combinations of the first module 120 and the second modules 200.

When multiple second modules 200 are available for pairing with the gateway 210, any of the multiple second modules 200 can be given preference to pair with the control device 110 through the gateway 210 based on one or more conditions related to the multiple second modules 200 or any other condition of the system 100. In an embodiment, the last saved/connected/paired second module 200 with the control device 110 and/or the gateway 210 can be given preference over the rest of the multiple second modules 200 to pair with the control device 110 through the gateway 210. In another embodiment, a user may set pre-stored preference order(s), settings, timelines, or any other criteria for the multiple second modules 200 to pair with the control device 110 through the gateway 210.

In some embodiments, pairing of the multiple second modules 200 with the control device 110 through the gateway 210 can be enabled only after authentication based on one or more of a passkey, a biometric ID, a questionnaire and the like. Further, this authentication can be performed by one of the multiple second modules 200 as prespecified by the user.

In an embodiment, the controller determines that the control device 110 is not paired with the gateway 210. The first module 120 is enabled to control the control device 110 (as shown in FIG. 1), this also in the event that there would be a gateway 210 available but is currently not used or paired or that the pairing of the control device 110 and gateway 210 was formerly resigned. In an advantageous manner this allows a control device 110 that was formerly used in a environment including a gateway 210 to be removed therefrom (un-pairing) and be in future used independently therefrom controlled via a first module 120. In an embodiment, the first network N1 and the second network N2 are based on same radio transmission. Further, the radio transmission can be based on any one of a Bluetooth communication, and WiFi, or any other wireless technology as used or known in the art.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 System
110 Control Device
112 Power Supply
114 Control Wires
120 First Module
122 First User
N1 First Network
130 Fluid Supply
132 Valve Unit
134 Pipes
136 Irrigation Devices
140 Irrigation Zone
200 Second Module
202 Second User
210 Gateway
N2 Second Network
300 Third User

The invention claimed is:

1. A system for controlling garden equipment by operating a garden equipment control device, the system comprising:
a first module configured to pair with the garden equipment control device over a first network, wherein the first module is configured to control the garden equipment control device when paired therewith;
a second module configured to wirelessly communicate with the garden equipment control device over a second network, wherein the second module is connected to the garden equipment control device through a gateway; and
a controller associated with the garden equipment control device, wherein the controller is configured to check whether the garden equipment control device is paired with the gateway;
wherein when the controller determines that the garden equipment control device is paired with the gateway:
the second module is enabled to control the garden equipment control device, and
the first module is disabled to control the garden equipment control device.

2. The system of claim 1, wherein when the controller determines that the garden equipment control device is not paired with the gateway:
the first module is enabled to control the garden equipment control device.

3. The system of claim 1, wherein any of the first module and the second module is incorporated in a portable user device.

4. The system of claim 3, wherein the portable user device is a smartphone configured with any of the any of the first module and the second module being an application to control the garden equipment control device.

5. The system of claim 1, wherein the first network and the second network are based on same radio transmission.

6. The system of claim 1, wherein the radio transmission is based on any one of a Bluetooth communication, and WiFi.

7. The system of claim 1, wherein both the first network and the second network are configured with any one of the first module or the second module.

8. The system of claim 1, wherein the first module and the second module are configured on a portable user device.

9. The system of claim 1, wherein the system comprises multiple second modules, wherein when the multiple second modules are available for pairing with the gateway, any of the multiple second modules, can be given preference to pair with the garden equipment control device through the gateway based on one or more conditions related to the multiple second modules.

10. The system of claim 9, wherein the last saved or connected or paired second module with the control device or the gateway is given preference over others of the multiple second modules to pair with the garden equipment control device through the gateway, or wherein the system enables a user to set pre-stored preference orders, settings, timelines, or any other criteria for the multiple second modules to pair with the garden equipment control device through the gateway.

11. The system of claim 1, wherein the garden equipment control device can be removed from the gateway or unpaired with the gateway and is configured to be controlled via the first module independent from the gateway.

12. The system of claim 1, wherein, if the controller determines that the garden equipment control device is not paired with the gateway, then the first module is enabled to control the garden equipment control device.

13. The system of claim 1, wherein pairing of the multiple second modules with the garden equipment control device through the gateway can be enabled only after authentication based on one or more of a passkey, a biometric ID, and a questionnaire as prespecified by the user.

14. The system of claim 1, wherein the garden equipment control device is operably coupled, in particular operates or controls, at least one or two or a plurality of garden equipment components.

\* \* \* \* \*